United States Patent [19]

Arthur et al.

[11] 4,334,703

[45] Jun. 15, 1982

[54] TUBE-TO-PLATE CONNECTION

[75] Inventors: James C. Arthur; Graham F. Thieman, both of Columbus, Ind.

[73] Assignee: Arvin Industries, Inc., Columbus, Ind.

[21] Appl. No.: 65,131

[22] Filed: Aug. 9, 1979

[51] Int. Cl.³ .................... F16L 13/14; F16L 41/08
[52] U.S. Cl. ................................ 285/222; 29/283.5; 29/432; 29/523; 29/157.4; 181/272; 285/382.2; 285/382.4
[58] Field of Search ............... 285/222, 382.4, 382.5, 285/424, 382.2, 381.1; 113/116 FF; 29/432; 181/272

[56] References Cited

U.S. PATENT DOCUMENTS

| | | | |
|---|---|---|---|
| 430,000 | 6/1890 | Clark | 113/116 FF |
| 512,021 | 1/1894 | Gould, Sr. | 113/116 FF |
| 1,637,750 | 8/1927 | Kilham | 285/382.5 X |
| 1,936,909 | 11/1933 | MacChesney | 113/116 FF |
| 2,035,686 | 3/1936 | Briegel | 285/382.2 X |
| 2,178,187 | 10/1939 | Sake | 29/513 |
| 2,241,768 | 5/1941 | Deremer . | |
| 2,254,558 | 9/1941 | Williams | 29/432 |
| 2,270,926 | 1/1942 | Briegel et al. | 285/382.2 X |
| 2,537,284 | 1/1951 | Schuder | 285/424 X |
| 3,326,006 | 6/1967 | Mount | 285/382.5 X |
| 3,557,903 | 1/1971 | Straw | 285/382.5 X |
| 3,726,000 | 4/1973 | Hafner | 113/116 FF X |
| 3,728,779 | 4/1973 | Behlen et al. | 113/116 FF X |
| 3,885,298 | 5/1975 | Pogonowski | 285/382.4 X |
| 4,192,531 | 3/1980 | Williams et al. | 285/222 |

FOREIGN PATENT DOCUMENTS 2173458 10/1973 France .

OTHER PUBLICATIONS

"Fastitch, Mechanical Joining Without Screws—Welds—Rivets".

*Primary Examiner*—Thomas F. Callaghan
*Attorney, Agent, or Firm*—Jenkins, Coffey, Hyland, Badger & Conard

[57] ABSTRACT

A tube-to-plate connection and method for making it utilize a plate defining an aperture where the tube is to be attached to the plate, with the portion of the plate surrounding the aperture including a flange extending away from the plane of the plate. The tube side wall lies generally within the flange. The flange and tube wall are simultaneously cut or staked radially by a piercing cutter-staker which pierces the walls of both flange and tube wall to prevent axial movement or rotation of the tube with respect to the flange.

15 Claims, 25 Drawing Figures

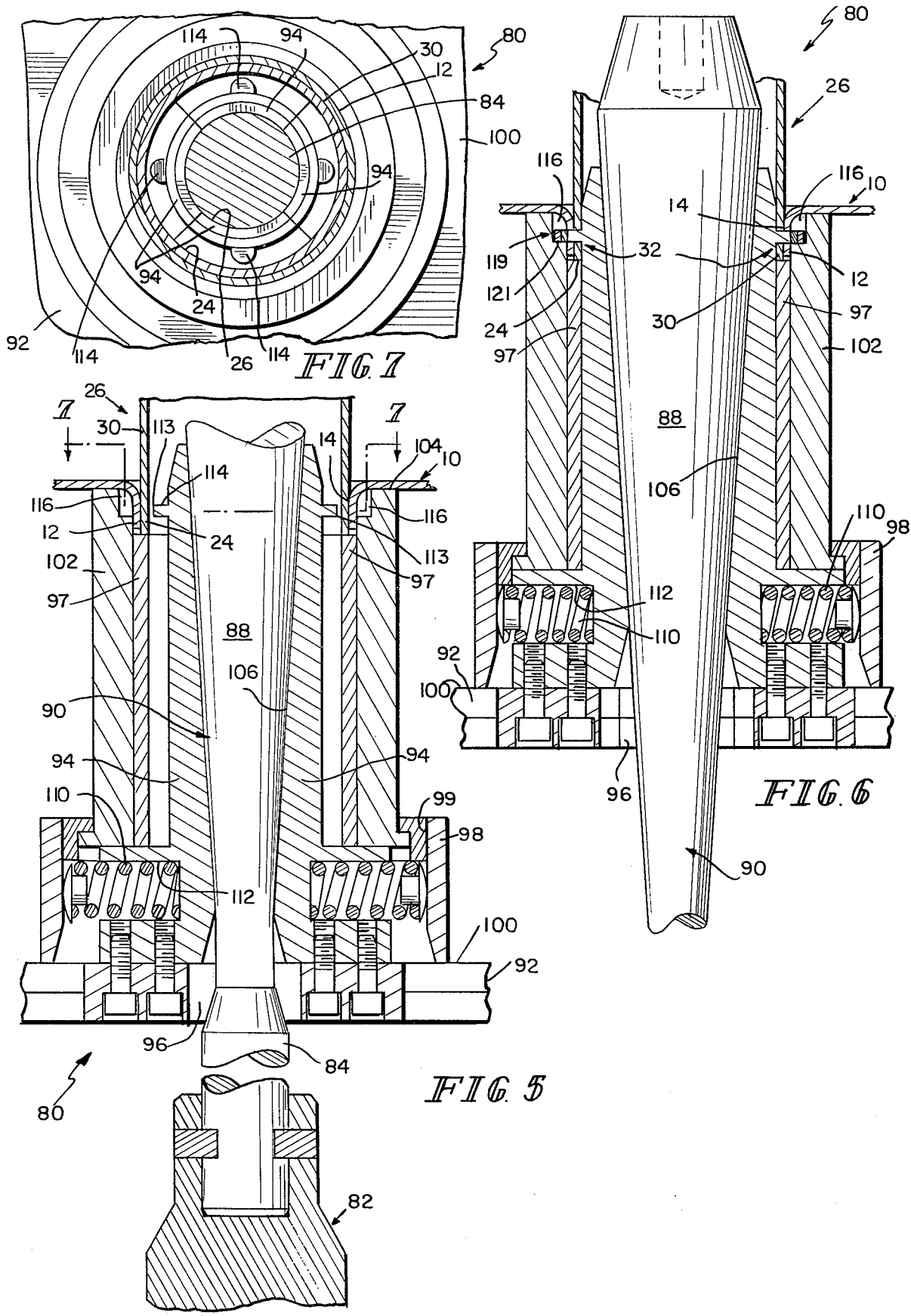

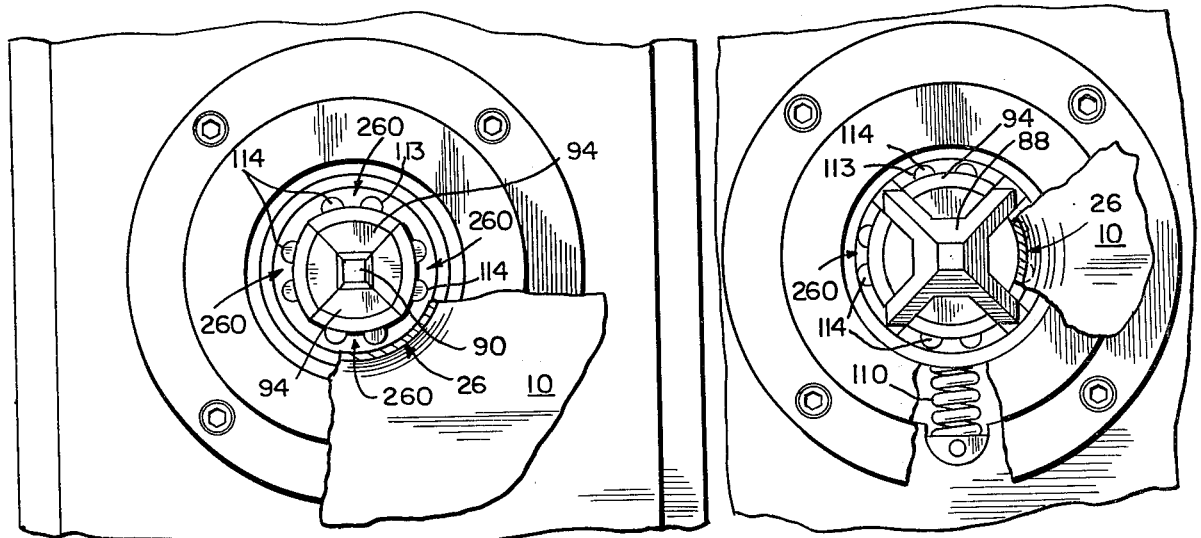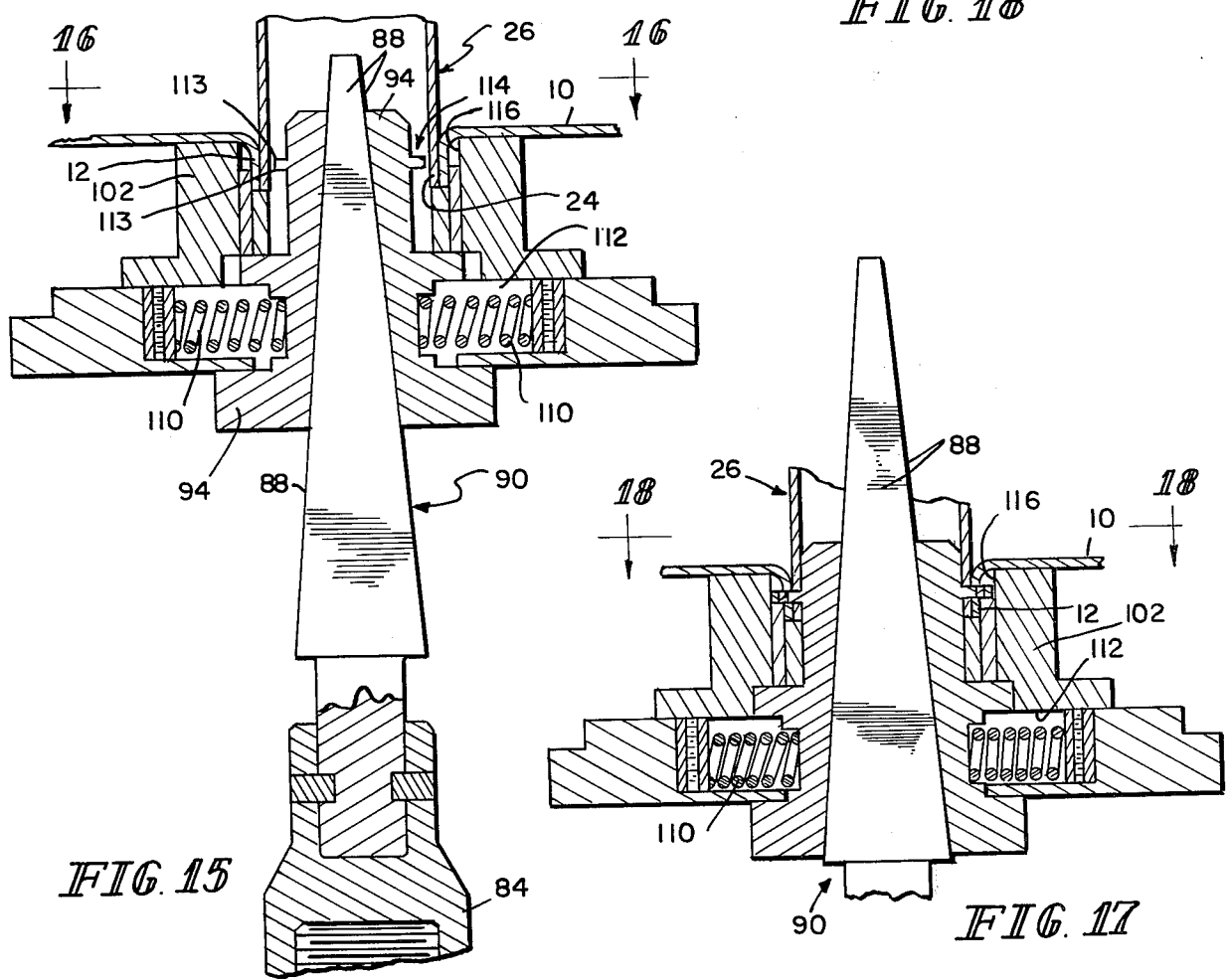

TUBE-TO-PLATE CONNECTION

This invention relates to tube-to-plate connections, and specifically to a quick, reliable and economical tube-to-plate connection, and to a method and apparatus for forming such connection.

Tube-to-plate connections are used in many structures. One area in which such connections are of substantial importance is in the manufacture of automotive exhaust system components, such as mufflers and catalytic converters. Conventionally, such connections have been made by welding a portion of a tube directly to the plate to which it is to be connected. Another method of forming a tube-to-plate connection includes the steps of forming a plurality of protrusions, or "dimples", in the side wall of a tube which is to be connected to a plate, and inserting the tube into an aperture provided in the plate until the dimples contact one surface of the plate, preventing further insertion of the tube through the aperture. Then, the portion of the tube which extends beyond the plane of the other side of the plate is formed over to prevent removal of the tube from the plate. It can be seen that this structure does not prevent rotation of the tube in the aperture. Rather, additional means, such as a single spot weld, or other structure or operation, must be provided to prevent relative rotation of the tube and plate.

Reference is here made to the following United States patents and applications for their showings of tube-to-plate connections: U.S. Pat. Nos. 3,761,116; 3,766,631; 2,164,629; 3,342,366; 1,395,707; 3,345,730; 1,057,664; 2,542,305; 2,634,786; 3,557,903; 2,480,629; 2,480,630; 139,374; 476,111; 3,982,778; 3,390,738; 2,666,677; 2,570,919; 3,797,297; 3,972,371; Ser. No. 908,392; Ser. No. 908,393; Ser. No. 970,551; and Ser. No. 972,042. Attention is also directed to Netherlands Pat. No. 91497. All of the above-identified applications are assigned to the same assignee as the instant application.

Particular attention is directed to the above-identified U.S. Pat. Nos. 3,345,730; 1,057,664; 139,374; 2,542,305; 3,557,903; 2,480,629; 2,480,630; and 476,111.

It is an object of the present invention to provide a low-cost, reliable tube-to-plate connection, as well as a method and apparatus for forming the connection.

According to the invention, a tube is connected to a plate about an aperture in the plate. Illustratively, the plate may define a chamber within a vehicle exhaust system component, such as a muffler, and the aperture may place the tube in open communication with the chamber. The portion of the plate surrounding the aperture includes a flange which extends away from the plane of the plate. The wall of the tube which is connected to the plate lies within the flange. The flange and tube wall are staked radially to prevent movement of the tube longitudinally out of engagement with the plate and to prevent rotation of the tube relative to the plate.

Additionally, according to the present invention, the method of joining the tube and plate comprises steps of forming the aperture in the plate where the tube is to be joined thereto, forming the flange around the perimeter of the aperture and joining the tube and plate. The flange includes a portion which extends generally along the side wall of the tube. The method further includes the steps of radially staking an opening in the flange side wall and radially staking the tube side wall radially into the opening to capture the tube against rotation and axial movement relative to the plate.

In illustrative embodiments, a plurality of such openings are formed in the flange, each such opening being a slot which extends circumferentially of the flange intermediate the flange edge remote from the plane of the plate and the plane of the plate. Further according to the illustrative embodiments, the openings in the flange and tube wall are formed simultaneously in a single piercing or staking operation.

The invention may best be understood by referring to the following description and accompanying drawings which illustrate the invention. In the drawings:

FIG. 5 is a partly sectional side elevational view of an apparatus for performing the tube-to-plate connection of FIGS. 1-2;

FIG. 6 is a partly sectional side elevational view of the apparatus of FIG. 5, after forming the tube-to-plate connection of FIGS. 1-2;

FIG. 7 is a fragmentary sectional view of the apparatus of FIGS. 5-6 taken generally along section lines 7—7 of FIG. 5;

FIG. 15 is a partly sectional side elevational view of an apparatus for performing a tube-to-plate connection according to the invention, with staking dies retracted;

FIG. 16 is a fragmentary sectional view taken generally along section lines 16—16 of FIG. 15;

FIG. 17 is a partly sectional side elevational view of the apparatus of FIGS. 15-16, with the staking dies projected;

FIG. 18 is a fragmentary sectional view taken generally along section lines 18—18 of FIG. 17;

Figure 1:
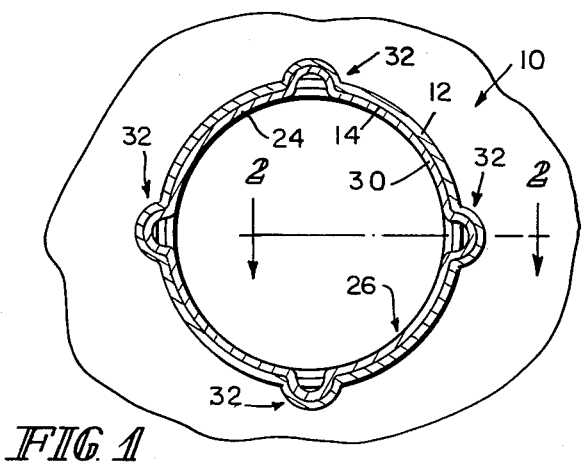
FIG. 1 is a fragmentary elevational view of a plate to which a tube has been connected in accordance with the method and apparatus of the invention.

With particular reference to FIGS. 1-2 and 5-7, the method and apparatus of the present invention will now be described generally. FIG. 1 shows a plate 10, which is a thin sheet of material, e.g., sheet steel, to which a tube is to be connected. Plate 10 includes a flange 12 region surrounding an aperture 14 formed in the plate. The flange region 12 can be formed by any of a number of well-known methods, such as extrusion.

After formation of the flange 12, the end 24 of a generally right circular cylindrical tube 26, having approximately the same outside diameter as the inside diameter of aperture 14, is inserted into the aperture 14. In the next step of the method, best illustrated by comparison of FIGS. 5-6, the side wall 30 of tube end 24 and the adjacent flange 12 are both radially pierced or staked at one or more places 32 (illustratively four) around their circumferences. It will be appreciated that this step prevents rotation of the tube 26 with respect to the plate 10. It will further be appreciated that this step prevents movement of tube 26 axially with respect to plate 10.

Figure 2:
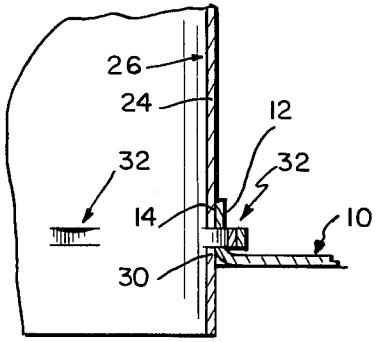
FIG. 2 is a fragmentary sectional view of the tube-plate assembly of FIG. 1 taken generally along section lines 2—2 thereof.

Turning now to FIGS. 5-7, an apparatus 80 for forming the tube-to-plate connection of FIGS. 1-2 will be discussed.

The apparatus 80 is a single step forming apparatus including a press 82 with a ram 84 movably supporting an element 90 provided with a conical side wall 88. The assembly apparatus 80 includes a table 92. Table 92 slidably supports a four-part die assembly having four identical dies 94. Dies 94 are situated about an opening 96 in table 92 for movement radially away from and toward the center of opening 96. The die 94 radially outward movement is limited by a stop ring 97. A collar 98 has a right circular cylindrical inner side wall 99. Collar 98 is mounted on the top surface 100 of table 92. A columnar plate 10 rest 102 is attached to collar 98 and extends upwardly above table 92 to provide a rest surface 104. Each die 94 has a radially inner conical contoured surface 106 mating with the contoured surface 88 of member 90. The dies 94 are urged radially inwardly against surface 88 by die springs 110 positioned in wells 112 on the radially, outer lower portions of dies 94. The springs work against the generally cylindrical inner side wall 99 of collar 98. As ram 84 is moved downward, dies 94 move uniformly radially outward. Semicircular cross-section cutting edges 113 of a staking or piercing knife 114 mounted in each die 94 adjacent its upper end deforms and then pierces both the tube 26 wall 30 and the flange 12. Notches 116 are provided at the upper end of rest 102 to accommodate the radially outwardly displaced material portions 119, 121 of flange 12 and tube end 24, respectively, forming the stake 32.

The outward motion of the dies 94 can also be used to flare the tube end 24 and flange 12 slightly. The die 94 outside surfaces can provide this flaring during their radially outward staking movements if they are appropriately shaped. Such flaring provides a tight engaging fit between flange and tube and provides lower flow restriction, or an improved entry for another tube.

Figure 8:
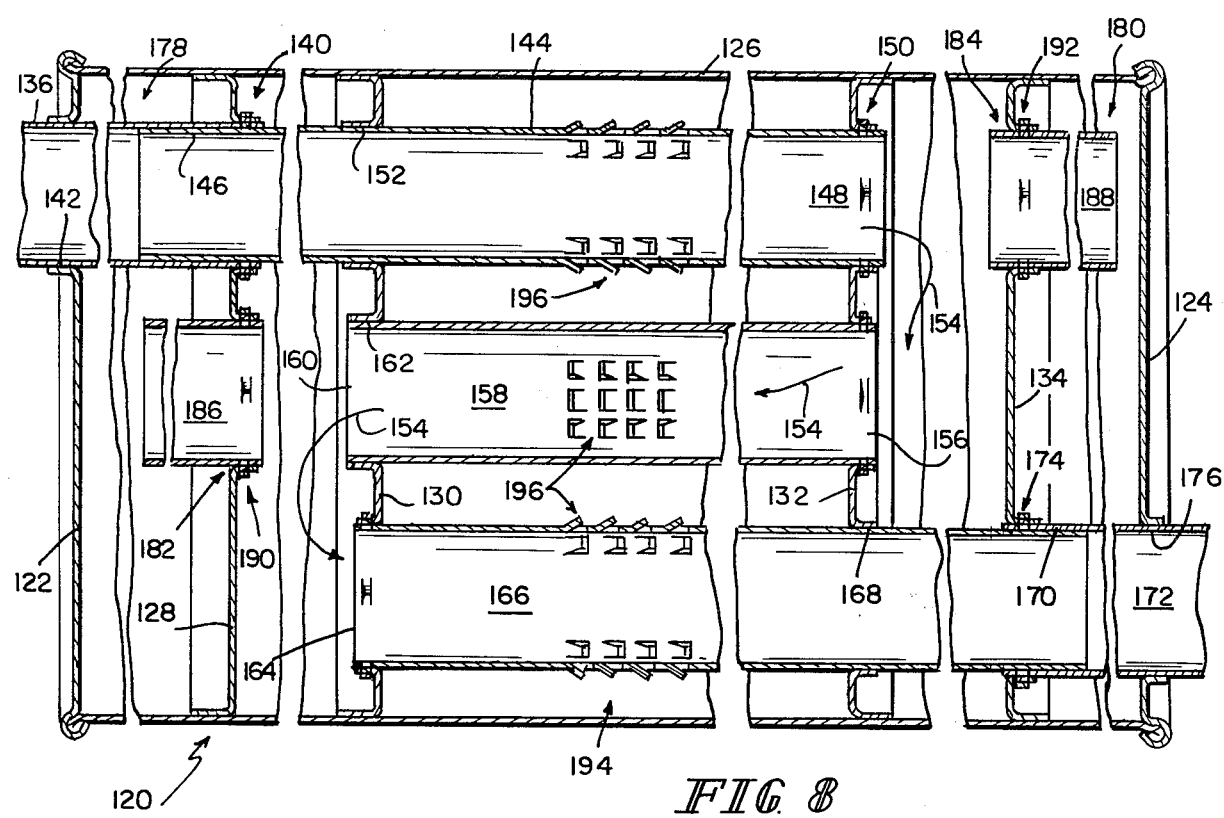
FIG. 8 is a sectional top plan view of a vehicle exhaust muffler utilizing a structure of the present invention.

The tube-to-plate construction illustrated in FIGS. 1-2 and 5-7 is ideally suited for use in vehicle exhaust system components. For example, and with particular reference to FIG. 8, an automotive exhaust system muffler 120 includes a pair of end plates or caps 122, 124 closing the ends of a generally right elliptical cylindrical shell 126. These elements 122, 124, 126 may be joined by any conventional technique, the joining structure shown including rolled seams. The interior of muffler 120 is divided into five resonating chambers by caps 122, 124 and internal baffle plates 128, 130, 132, 134. Communication among the various chambers within muffler 120 is provided, in part, by an inlet tube section 136 mounted in plate 128 by a tube-to-plate connection 140 made in accordance with the present invention. Tube section 136 extends through an aperture 142 in cap 122 and is sealingly secured therein, e.g., by welding. Exhaust gases which enter through inlet tube section 136 next pass through inlet tube section 144, one end 146 of which is slidingly received in tube section 136, and the other end 148 of which is connected at 150 to plate 132 by a tube-to-plate connection according to the present invention. Inlet tube section 144 is slidingly received in an aperture 152 in plate 130.

The general direction of flow from end 148 of inlet tube section 144 is as indicated by arrows 154 into the inlet end 156 of a tube section 158. The inlet end 156 of tube section 158 is fixed in plate 132 by a tube-to-plate connection according to the present invention. The outlet end 160 of tube section 158 is slidingly received in an aperture 162 in plate 130. The exhaust gas flows in the general direction of arrows 154 from the outlet end 160 of tube section 158 to the inlet end 164 of an outlet tube section 166. Again, the inlet end 164 of tube 166 is connected to plate 130 by a tube-to-plate connection constructed according to the present invention. Outlet tube section 166 extends slidingly through an aperture 168 in plate 132 and is slidingly received in an end 170 of an outlet tube section 172. Tube section 172 is connected to plate 134 by a tube-to-plate connection 174 according to the present invention. Outlet tube section 172 extends from the muffler 120 through an aperture 176 provided in end cap 124. Tube section 172 is sealingly supported in end cap 124, for example, by welding.

End resonant cavities 178, 180 are formed, respectively, between end cap 122 and plate 128 and between plate 134 and end cap 124. The throats 182, 184 of cavities 178, 180, respectively, are provided by lengths of tubing 186, 188 attached to plates 128, 134, respectively, by tube-to-plate connections 190, 192, respectively. Tube-to-plate connections 190, 192 are made in accordance with the present invention. A cavity 194 is provided between plates 130, 132. Communication with cavity 194 can be established by louver patches 196 in each of inlet tube section 144, tube section 158, and outlet tube section 172, or by additional apertures (not shown) in either or both of plates 130, 132 or by some combination of louver patches and apertures as needed.

In the embodiments of the invention illustrated in FIGS. 3-4, 9-11, 12-14, and 15-18, those elements identified by the same reference numerals as in the embodiment of FIGS. 1-2 and 5-7 perform the same or similar functions.

Figure 3:
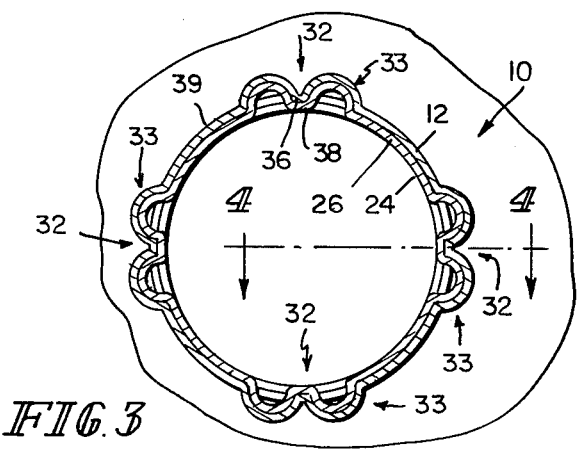
FIG. 3 is a fragmentary elevational view of a plate to which a tube has been connected in accordance with the method and apparatus of the invention.
Figure 4:
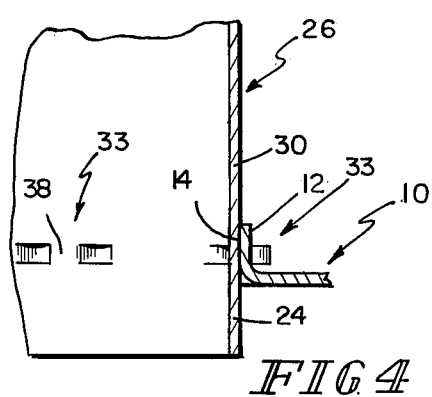
FIG. 4 is a fragmentary sectional view of the tube-plate assembly of FIG. 3 taken generally along section lines 4—4 thereof.

Referring now to FIGS. 3-4, a plate 10 includes a flange 12 surrounding an aperture 14 formed in the plate. Again, the flange 12 can be formed by any suitable method, such as extrusion. After the flange 12 is formed, end 24 of tube 26 is inserted into aperture 14. The side wall 30 of tube end 24 and the adjacent flange 12 are both pierced at four pairs 33 of equally circumferentially spaced locations 32. The pierces 32 of each pair 33 are closely spaced, leaving only relatively thin circumferentially extending flange 12 and wall 30 regions 36, 38, respectively, between the pierces 32. Considerably longer circumferential sections 39 are provided between the adjacent pierces 32 of adjacent pairs 33.

Again, it will be appreciated that this assembly technique prevents rotation of tube 26 in aperture 14 as well as relative axial movement between the tube 26 and plate 10. It has been found that the "four-pairs" technique illustrated in FIGS. 3–4 provides a structurally stronger connection between the tube 26 and plate 10 than eight equally circumferentially spaced pierces.

Figure 11:
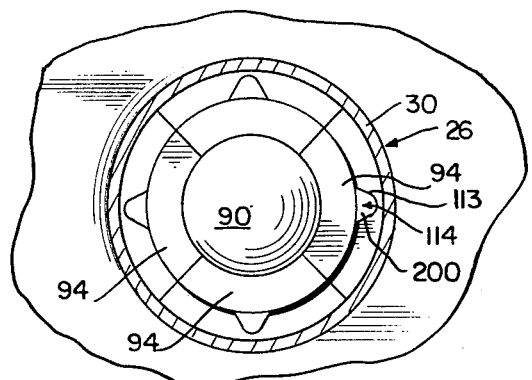
FIG. 11 is a fragmentary sectional view taken generally along section lines 11—11 of FIG. 10.
Figure 9:
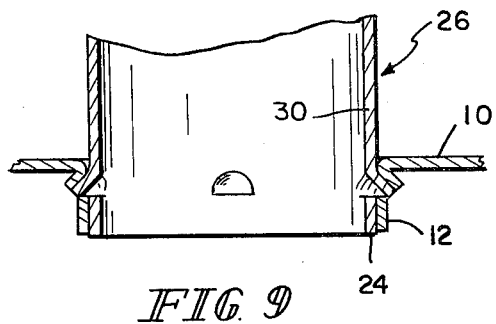
FIG. 9 is a fragmentary longitudinal sectional view through a tube which has been connected to a plate in accordance with the method and apparatus of the present invention.
Figure 10:
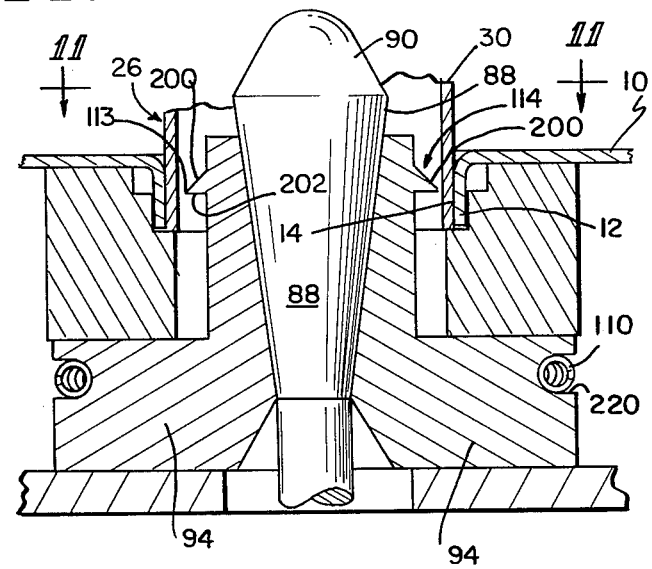
FIG. 10 is a partly sectional side elevational view of an apparatus for performing the tube-to-plate connection of FIG. 9.

In the embodiment of the invention illustrated in FIGS. 9–11, the staking or piercing knives 114 have generally convexly contoured upper surfaces 200 and flat lower surfaces 202 forming a sharp cutting edge 113. The flange 12 projects away from the plane of plate 10 to a distance less than the projection of tube end 24 through aperture 14. However, both tube end 24 and flange 12 are pierced by knives 114.

In this embodiment, the dies 94 are urged radially inwardly against the conical contour 88 of member 90 by a single spring 110 which extends circumferentially about dies 94 and lies in grooves 220 provided in the lower radially outer surfaces of dies 94.

Figure 14:
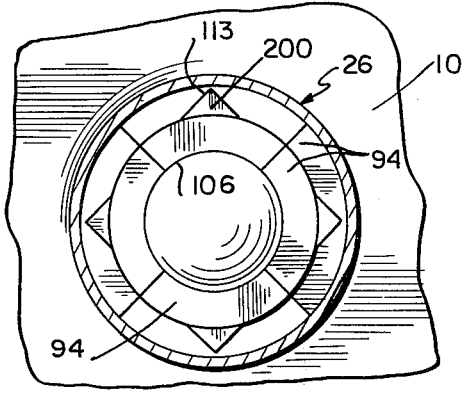
FIG. 14 is a fragmentary sectional view taken generally along section lines 14—14 of FIG. 13.
Figure 12:
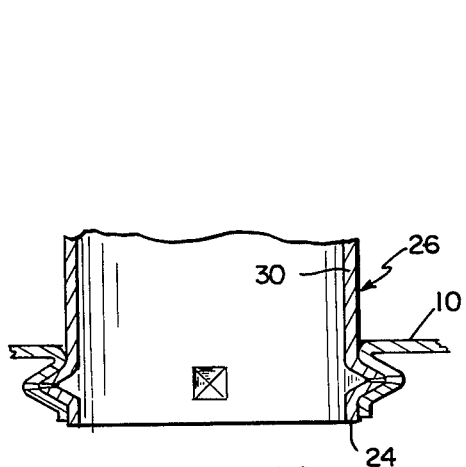
FIG. 12 is a fragmentary longitudinal sectional view through a tube which has been connected to a plate in accordance with the method and apparatus of the present invention.
Figure 13:
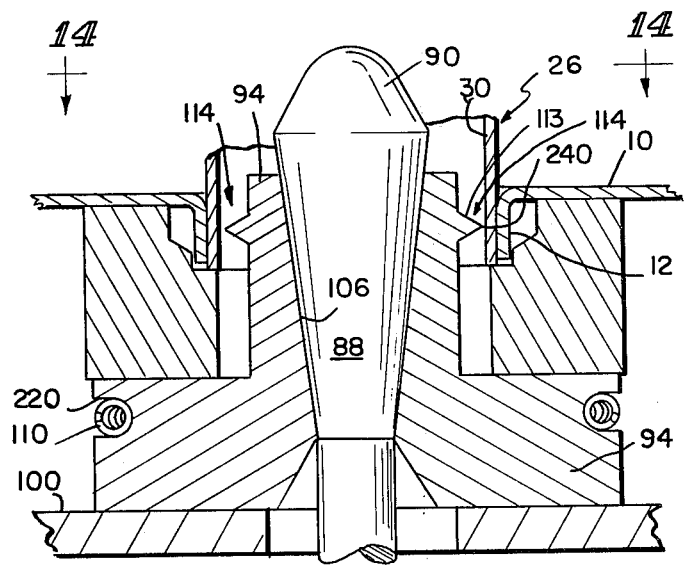
FIG. 13 is a partly sectional side elevational view of an apparatus for performing the tube-to-plate connection of FIG. 12.

In the embodiment of the invention illustrated in FIGS. 12–14, the staking or piercing knives 114 are generally pyramid-shaped, forming a sharp piercing point 240 and four sharp cutting edges 113. Again, as illustrated in FIG. 13, the dies 94 are urged radially inwardly against the conical contour 88 of member 90 by a single spring 110 which extends circumferentially about dies 94 and lies in grooves 220 provided in the lower radially outer surfaces of dies 94.

In the embodiment of the invention illustrated in FIGS. 15–18, the staking or piercing knives 114 have generally circular horizontal cross-section cylindrical shapes. Each knife 114 thus provides a pair of sharp cutting edges 113. The knives 114 in this embodiment are disposed in pairs 260, one pair being provided on each die 94. The pierces or stakes formed by this knife arrangement are as illustrated and described in FIGS. 3–4 and the discussion of those FIGS.

In this embodiment, the dies 94 are urged radially inwardly against the flat, upwardly and inwardly tapering contours 88 of a generally pyramid-shaped member 90 by die springs 110 mounted in wells 112 positioned as illustrated and described in FIGS. 5–7 and the discussion of those figures. The ram 84 and associated press 82 (not shown) move upward to force dies 94 radially outward to stake the tube 26 and flange 12 together.

Figures 19, 20:
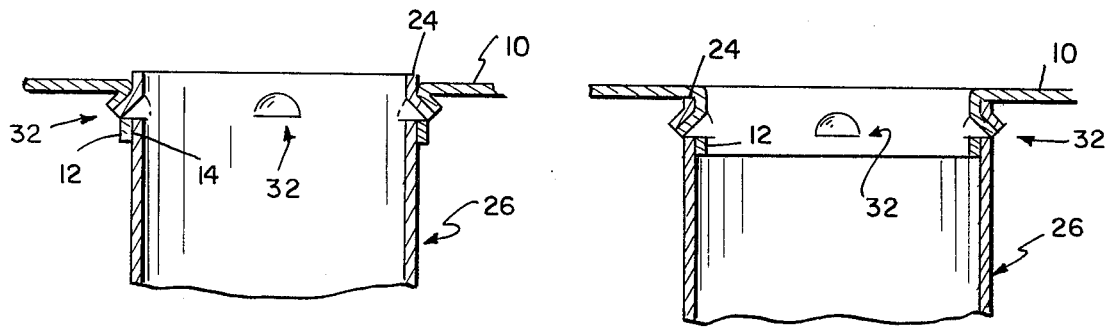
FIG. 19-20 are sectional side elevational views of two staked tube-to-plate connections made according to the present invention.

In the embodiment of the invention illustrated in FIG. 19, the end 24 of tube 26 has been inserted through the aperture 14 in plate 10 from the flange 12 side. The stakes 32 in this embodiment have the same configuration as, and may be made by an apparatus similar to, that shown in FIGS. 9–11.

In the embodiment of the invention illustrated in FIG. 20, the end 24 of tube 26 is also joined to the plate 10 on the flange 12 side. However, in this embodiment, the flange 12 is inserted into the tube end 24, rather than the tube end 24 being inserted into the flange. Again, the stakes 32 can be made by an apparatus and method similar to the apparatus and method illustrated and described in connection with FIGS. 9–11.

Figure 21:
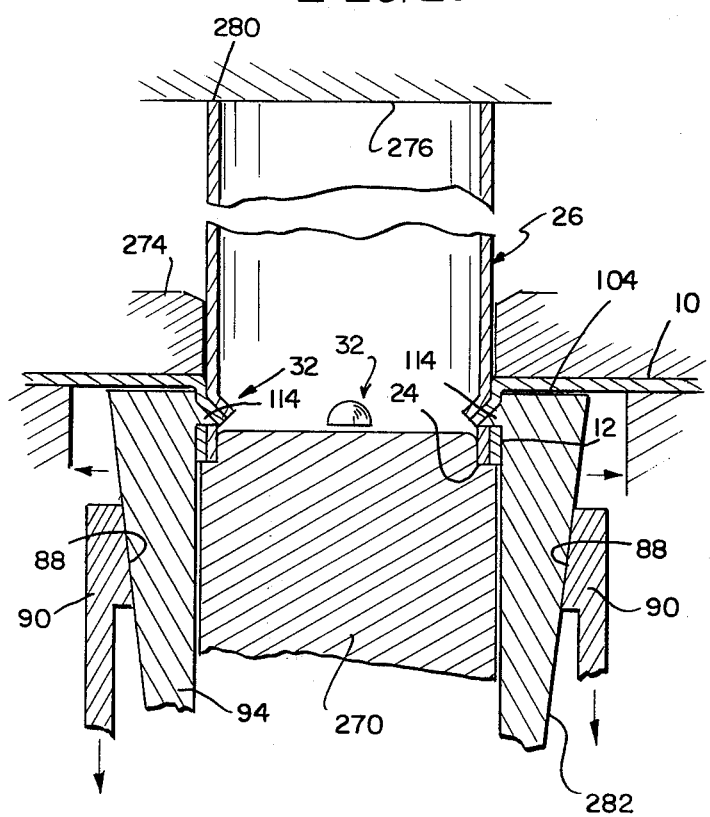
FIG. 21 is a partly sectional side elevational view of an apparatus for forming a tube-to-plate connection according to the invention.
Figure 22:
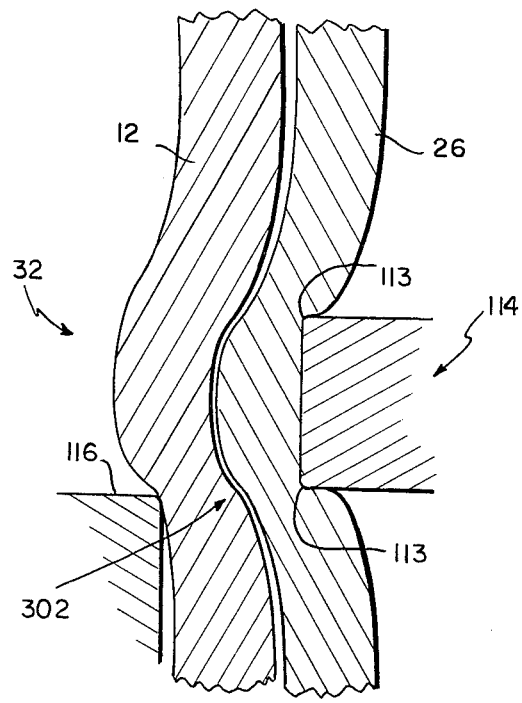
FIGS. 22-25 illustrate steps of the progressive formation of an actual staked tube-to-plate connection made in accordance with the invention.
Figure 23:
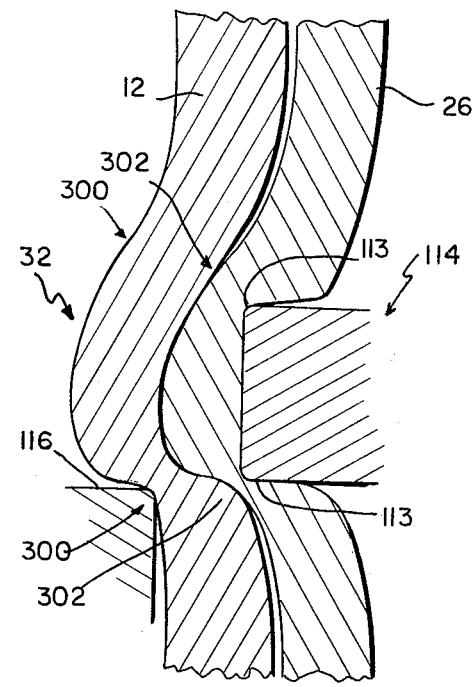
Figure 24:
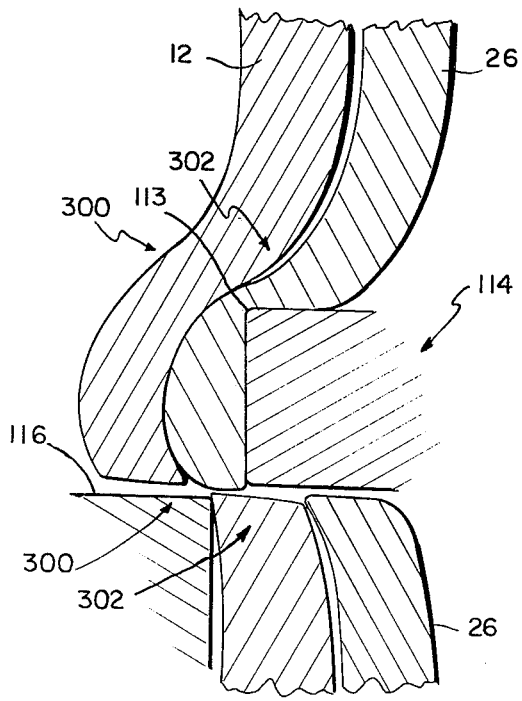
Figure 25:
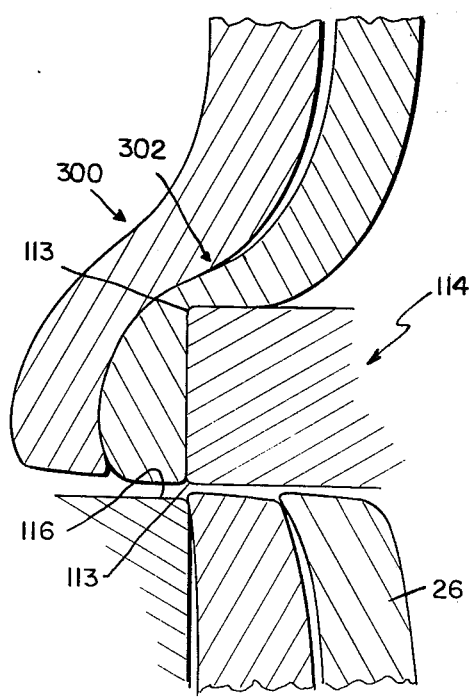

In FIG. 21, an apparatus and method are illustrated for staking the flange 12 and tube end 24 together from the outside. In this embodiment, the end 24 of tube 26 is inserted into the flange 12 of plate 10 as the plate 10 rests upon the top surfaces 104 of the dies 94. A mandrel 270 projects into the tube end 24 to a level directly beneath the level at which the stakes 32 are to be made. The dies 94 are urged, as by springs (not shown), radially outwardly to permit placement of the tube end 24 and flange 12 over the mandrel. Additional locking members 274, 276, respectively, may be brought into engagement with the top surface of plate 10 and the tube 26 end 280 remote from tube end 24 to prevent the plate 10 or tube 26 from "backing out" of the staking mechanism. It should be understood, however, that these additional locking members may or may not be necessary in a particular application. The dies 94 are provided with conical, downwardly and inwardly tapering contours 282. These contours are engaged by the upwardly and outwardly flaring, conical contour 88 of an annular, die-actuating ring 90. Ring 90 is moved upwardly to stake the flange 12 and tube end 24, and downwardly to release the staked flange 12 and tube end 24 from the knives 114 by a ram 84 and press assembly (not shown) of the same type described in connection with the embodiment of FIGS. 1–2 and 5–7.

Referring back to the presently preferred "four pairs" embodiment of FIGS. 3–4 and 15–18, it has been found that the combination of a tight engaging fit between tube end 24 and flange 12, coupled with the four equally-spaced pairs 33 of staked segments 32, provide a fastening arrangement which is acceptable for vehicle exhaust system non-structural (non-load bearing) connections. This arrangement is also believed to be acceptable for many vehicle exhaust system structural (load bearing) connections as well. The tight engaging fit is provided inherently with mechanical expansion (flaring) which takes place when the dies 94 engage the tube 26 radially inner side walls. The following figures have been established as providing acceptable connections for tubes 26 in the 1.75" (4.4 cm) to 2.0" (5 cm) range: the staking knife 114 surfaces 296, 298 (FIG. 15) are perpendicular to the flange 12 and tube 26 axes to within 2° each; the distance between surfaces 296, 298 at the base of each knife 114 (adjacent the body of each die 94) is 0.093" (2.36 mm); spacing between knives 114 of each pair 260, 0.15" (3.8 mm); approximate radius of each surface 296, 298, 0.0937 times the radius of a circle which would circumscribe all of the knives 114 when viewed as in FIG. 18 with all of dies 94 in their expanded (projected) positions; total distance across the knives 114 of each pair 260, 0.525" (1.33 cm); at least six of the eight staking knives 114 should penetrate the outer surface of flange 12 from 0" (0 cm) minimum to 0.015" (0.38 mm) maximum on the radially outer surface of flange 12. Flange 12 should have an axial length of at least 0.38" (9.7 mm). The shear edge of any staked portion 32 nearest the distal end of flange 12 should be no closer to the distal end of flange 12 than 0.09" (2.29 mm). It is believed that these criteria, if followed, provide a mechanical connection of a tube to a plate which is as good as, or better than, conventional electric spot-welding techniques providing spotwelds at four locations around the flange 12 and tube end 24 circumferences. FIGS. 22–25 illustrate photographs of the progressive formation of an actual staked tube-to-plate connection made in accordance with the invention. These figures illustrate cross sections through an individual staked segment 32 longitudinally of the flange 12 and tube 26 axes. As shown, the knife edges 113 of staking knife 114 do not always shear the staked segments 32 of the flange 12 and tube 26 on both of their axially facing edges 300, 302, as FIGS. 2, 4, 6, and 17 would suggest. Whether or not edges 300, 302 are sheared from the surrounding flange 12 and tube 26 side wall material depends upon the configurations of the notches 116 in the rests 102 (FIGS. 15, 17), among other factors. As discussed above, satisfactory connections can be made employing several staked segments 32 in which not all of the edges 300, 302 are sheared.

What is claimed is:

1. A mechanical connection, comprising a plate having a tubular flange extending therefrom, said flange having a radially inner surface and a radially outer surface, a tubular member extending alongside said flange, and means for mechanically joining said plate and said tubular member including at least two staked segments in generally the same plane about the axes of said tubular member and said flange, each staked segment comprising a circumferentially extending strip of the tubular member side wall and a registering strip of the flange wall, with at most one of the axially facing side edges of the strip of each of the tubular member wall and flange wall being sheared and the sheared axially facing side edge of one of the tubular member and flange walls protruding at least substantially to the region of the wall of the other of the tubular member and flange surrounding the strip, whereby rotational and longitudinal movement of the tubular member with respect to the flange is prevented.

2. The connection as recited in claim 1 wherein said tubular member extends through said flange, and the sheared axially facing side edge of the wall of said tubular member protrudes at least substantially to the outer surface of the wall of said flange.

3. The connection as recited in claim 1 wherein said flange extends through said tubular member and the sheared axially facing side edge of the wall of said flange protrudes at least substantially to the outer surface of the wall of said tubular member.

4. The connection as recited in claim 1 wherein said tubular member and said flange include a radially inner surface and a radially outer surface, the dimensions and configurations of which are sufficiently similar to provide tight engagement between the flange and tubular member.

5. The connection as recited in claim 1 wherein the plate defines an aperture, the flange surrounding the aperture.

6. The connection as recited in claim 1 wherein both strips are longer in their circumferential dimension than in their axial dimension.

7. In combination, a plate, a tube having a predetermined cross-sectional configuration, a tubular flange projecting from the plane of the plate and having substantially said predetermined cross-sectional configuration to engage the tube in close-fitting relation, and means for attaching the tube and flange in substantially rigid non-rotating relation, the attachment means including a radial series of staked segments in the tube side wall and flange wall in generally the same plane about the axes of the tube and flange, each staked segment comprising a circumferentially extending strip of the tube side wall and a registering strip of the flange wall, with at most only one of the axially facing side edges of the strip of each of the tube side wall and flange wall being sheared and the sheared axially facing side edge of one of the tube and flange side walls protruding at least substantially to the region of the wall of the other of the tube and flange surrounding the strip, whereby rotational and longitudinal movement of the tube with respect to the flange is prevented.

8. The combination of claim 7 in which the flange is received within the tube.

9. The combination of claim 7 in which the tube is received within the flange.

10. The combination of claim 8 or 9 and further comprising means defining an aperture in the plate, the flange surrounding the aperture.

11. The combination of claim 8 or 9 wherein the attachment means comprises four pairs of staked segments, the pairs being spaced substantially equidistantly about the perimeters of the flange and tube, and the staked segments of each pair being closely spaced to provide between them an unstaked portion of the tube and flange.

12. A mechanical connection, comprising a plate having a tubular flange extending therefrom, said flange having a radially inner surface and a radially outer surface, a tubular member having a radially inner surface and a radially outer surface and extending alongside said flange, and means for mechanically joining said plate and said tubular member including a plurality of staked segments spaced apart circumferentially in generally the same plane about the axes of the tubular member and flange and projecting radially outwardly therefrom, each staked segment comprising a circumferentially extending strip of the tubular member side wall and a registering strip of the flange wall, with at most one of the axially facing side edges of the strip of the tubular member side wall being sheared and at most one of the axially facing side edges of the strip of the flange wall being sheared, the radially inner surface of one of the tubular member side wall and flange wall protruding at least substantially to the radially outer surface of the wall of the other of the tubular member and flange surrounding the strip, whereby rotational and longitudinal movement of the tubular member with respect to the flange is prevented.

13. The apparatus of claim 12 wherein each strip is longer in its circumferential dimension than in its axial dimension.

14. The apparatus of claim 13 wherein pairs of such staked segments are provided, the segments of each pair being closely spaced circumferentially about the tubular member and flange and the pairs being substantially equally circumferentially spaced about the tubular member and flange.

15. The apparatus of claim 14 wherein there are four such pairs.

* * * * *

UNITED STATES PATENT AND TRADEMARK OFFICE
CERTIFICATE OF CORRECTION

PATENT NO. : 4,334,703
DATED : June 15, 1982
INVENTOR(S) : James C. Arthur et al It is certified that error appears in the above-identified patent and that said Letters Patent is hereby corrected as shown below:

In Abstract, line 5, delete "side wall".

In Abstract, line 6, change "wall" to --end--.

Column 2, line 66, change "FIG." to --FIGS.--.

Column 6, line 42, after "the" insert --upper and lower--.

Column 6, line 42, delete "296,298".

Column 6, line 44, change "2" each" to --$2°$ each--.

Column 6, line 44, delete "296,298".

Column 6, line 48, delete "296,298".

Signed and Sealed this

Sixteenth Day of August 1983

[SEAL]

Attest:

GERALD J. MOSSINGHOFF

Attesting Officer    Commissioner of Patents and Trademarks

Disclaimer 4,334,703.—*James C. Arthur* and *Graham F. Thieman*, Columbus, Ind. TUBE-TO-PLATE CONNECTION. Patent dated June 15, 1982. Disclaimer filed July 16, 1982, by the assignee, *Arvin Industries, Inc.*

The term of this patent subsequent to June 8, 1999, has been disclaimed.
[*Official Gazette August 30, 1983.*]